US012494566B2

(12) United States Patent
Wu et al.

(10) Patent No.: US 12,494,566 B2
(45) Date of Patent: Dec. 9, 2025

(54) ELECTRONIC DEVICE

(71) Applicant: PEGATRON CORPORATION, Taipei (TW)

(72) Inventors: Chien-Yi Wu, Taipei (TW); Chao-Hsu Wu, Taipei (TW); Chih-Wei Liao, Taipei (TW); Hau Yuen Tan, Taipei (TW); Shih-Keng Huang, Taipei (TW); Wen-Hgin Chuang, Taipei (TW); Lin-Hsu Chiang, Taipei (TW); Chang-Hua Wu, Taipei (TW); Han-Wei Wang, Taipei (TW); Chun-Jung Hu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 406 days.

(21) Appl. No.: 18/186,884

(22) Filed: Mar. 20, 2023

(65) Prior Publication Data

US 2023/0378638 A1 Nov. 23, 2023

(30) Foreign Application Priority Data

May 23, 2022 (TW) .................................. 111119108

(51) Int. Cl.
*H01Q 1/24* (2006.01)
*H01Q 1/38* (2006.01)
*H01Q 9/40* (2006.01)

(52) U.S. Cl.
CPC ............... *H01Q 1/243* (2013.01); *H01Q 1/38* (2013.01); *H01Q 9/40* (2013.01)

(58) Field of Classification Search
CPC ............ H01Q 1/243; H01Q 1/38; H01Q 9/40; H01Q 1/02; H01Q 7/00; H01Q 9/42; H01Q 21/28
See application file for complete search history.

(56) References Cited

U.S. PATENT DOCUMENTS 11,228,093 B2 1/2022 Won et al.
2021/0044003 A1* 2/2021 Ma ......................... H01Q 13/10
2021/0408682 A1* 12/2021 Khripkov ............... H01Q 21/24

FOREIGN PATENT DOCUMENTS

CN 113067146 7/2021
TW I633714 8/2018

OTHER PUBLICATIONS

Kurvinen, J., 2020. Co-Existing Antennas in Modern Handsets.*

* cited by examiner

*Primary Examiner* — Zhitong Chen
(74) *Attorney, Agent, or Firm* — J.C. PATENTS

(57) ABSTRACT

An electronic device including a metal housing, a first antenna module, and a second antenna module is disclosed. The metal housing includes a back cover and a frame, the frame is located on a side of the back cover, and a slot is arranged between the back cover and the frame. The frame includes two slits and a segment, and the two slits are connected with the slot to form a U shape. The segment is surrounded by the two slits and the slot. The first antenna module includes an antenna radiator formed by the segment. The antenna radiator is coupled to the back cover across the slot through multiple connecting portions. The second antenna module is disposed on the connecting portions to be coupled to the back cover and grounded, and an antenna coupling gap exists between the second antenna module and the frame.

11 Claims, 11 Drawing Sheets

ELECTRONIC DEVICE

CROSS-REFERENCE TO RELATED APPLICATION

This application claims the priority benefit of Taiwan application serial no. 111119108, filed on May 23, 2022. The entirety of the above-mentioned patent application is hereby incorporated by reference herein and made a part of this specification.

BACKGROUND

Technical Field

This disclosure relates to an electronic device, in particular to an electronic device having multiple antennas.

Description of Related Art

In recent years, electronic devices with a metallic feel (e.g., tablet computers, laptops, etc.) have become increasingly popular among consumers. However, the metal housing structure often forms capacitive effect and affects the performance of the antenna of the electronic device. In addition, as the size of electronic devices becomes smaller and the internal metal structure is more complex, the antenna layout space is limited. Therefore, how to place multiple antennas in a limited space to improve the space utilization of electronic devices, and make electronic devices retain a metallic housing is an urgent problem in this field.

SUMMARY

The disclosure provides an electronic device that may be disposed with multiple antennas in a limited space to improve space utilization of the electronic device and to keep the electronic device with a metal housing.

An electronic device disclosed in the disclosure includes a metal housing, a first antenna module, and a second antenna module. The metal housing includes a back cover and a frame. The frame is located on a side of the back cover, and a slot is between the back cover and the frame. The frame includes two slits and a segment, and the two slits are connected with the slot to form a U shape. The segment is surrounded by two slits and the slot. The first antenna module is configured to resonate at a first frequency band and a second frequency band, and includes an antenna radiator formed by the segment. The antenna radiator is coupled to the back cover across the slot through multiple connecting portions. The second antenna module is disposed on the connecting portions to be coupled to the back cover and grounded, and an antenna coupling gap exists between the second antenna module and the frame. The second antenna module is configured to resonate at a third frequency band. A radiation direction of the first antenna module is perpendicular to a radiation direction of the second antenna module.

Based on the above, the first antenna module of the electronic device of the disclosure includes the antenna radiator formed by the segment of the frame of the metal housing, and the antenna radiator is connected to the back cover of the metal housing through the connecting portion for grounding. The second antenna module is stacked on the connecting portion to improve the space utilization of the electronic device. In addition, the radiation direction of the first antenna module is perpendicular to the radiation direction of the second antenna module, thus avoiding mutual interference between the two antennas. In this way, the electronic device of the disclosure may realize the integration of multiple antennas to improve the space utilization of the electronic device and keep the aesthetic appearance of the metal housing of the electronic device.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
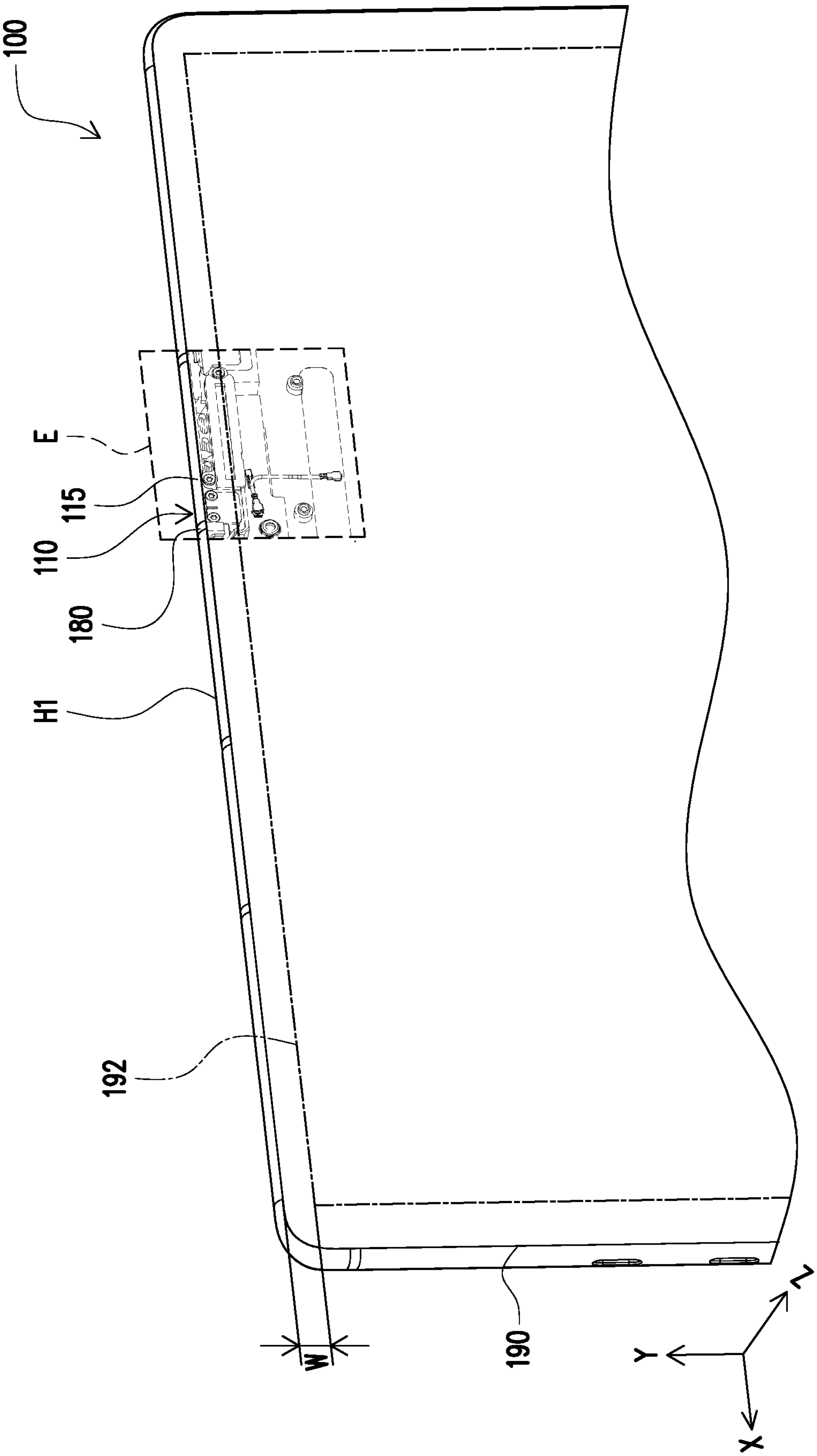
FIG. 1 is a partial schematic diagram of an electronic device according to an embodiment of the disclosure.
Figure 2:
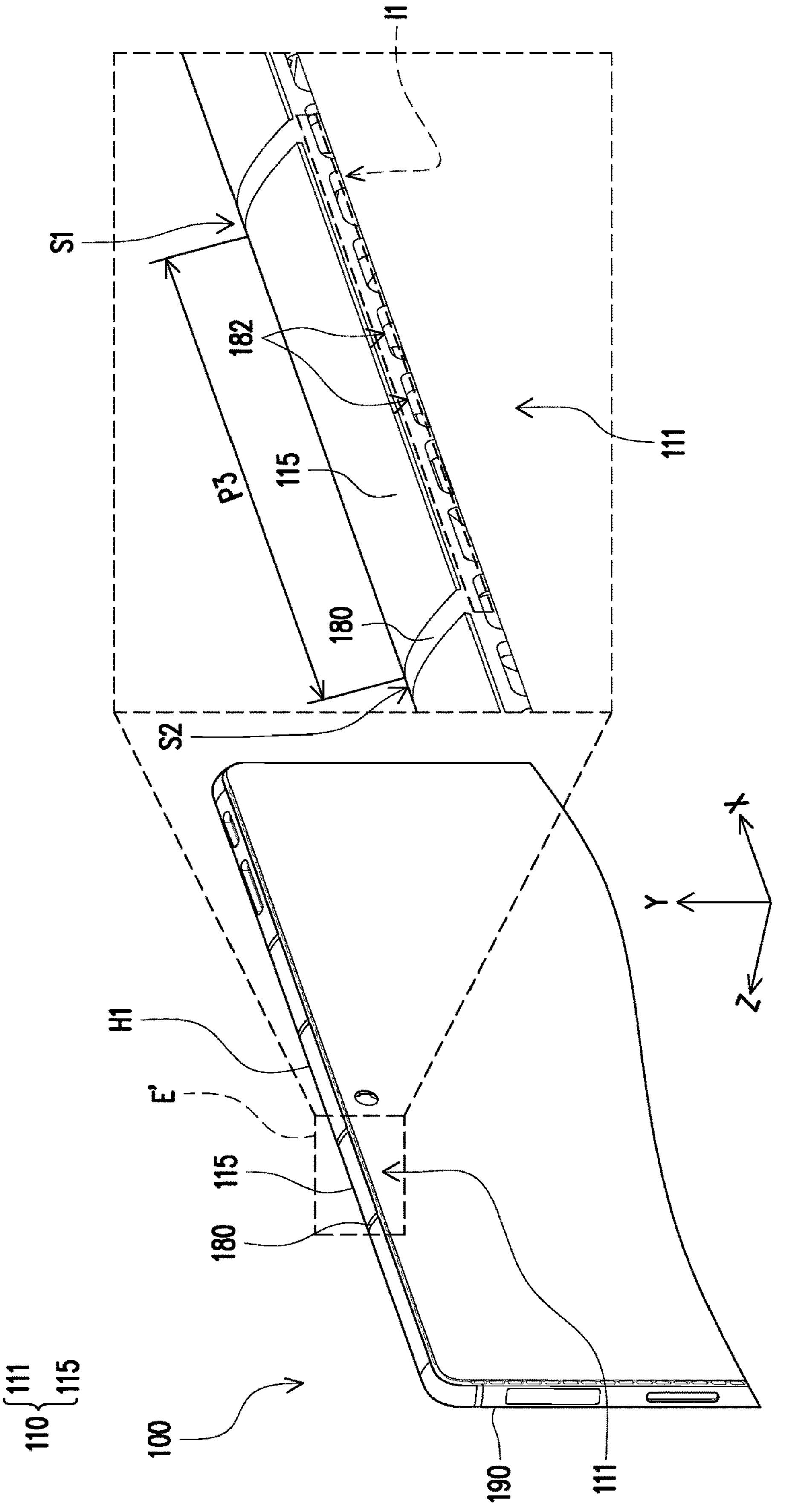
FIG. 2 is a partial schematic diagram of the electronic device in FIG. 1 from another viewpoint.

FIG. 1 is a partial schematic diagram of an electronic device according to an embodiment of the disclosure. FIG. 2 is a partial schematic diagram of the electronic device in FIG. 1 from another viewpoint. An electronic device 100 is, for example, a tablet computer, but not limited thereto. Coordinates X-Y-Z are provided herein for the description of components. Referring to FIG. 1 and FIG. 2 at the same time, the electronic device 100 includes a screen 190, a metal housing 110 and a housing connecting portion 180.

As shown in FIG. 1, the screen 190 is disposed on the metal housing 110. The metal housing 110 includes a back cover 111 (FIG. 2) and a frame 115, and electronic elements of the electronic device 100 are disposed in the metal housing 110. An area E shows in perspective a part of electronic elements disposed in the metal housing 110. Here, the area E is located on a long side H1 of the electronic device 100, but not limited thereto.

In order to clearly show a positional relationship between the metal housing 110 and the housing connecting portion 180, FIG. 2 also includes a partially enlarged diagram of an area E'. The area E' is located on the long side H1 of the electronic device 100 and roughly corresponds to the area E of FIG. 1. As shown in the partially enlarged diagram of FIG. 2, a housing connecting portion 180 is disposed between the back cover 111 and the frame 115. A material of the housing connecting portion 180 is, for example, plastic, but not limited thereto.

Figure 3:
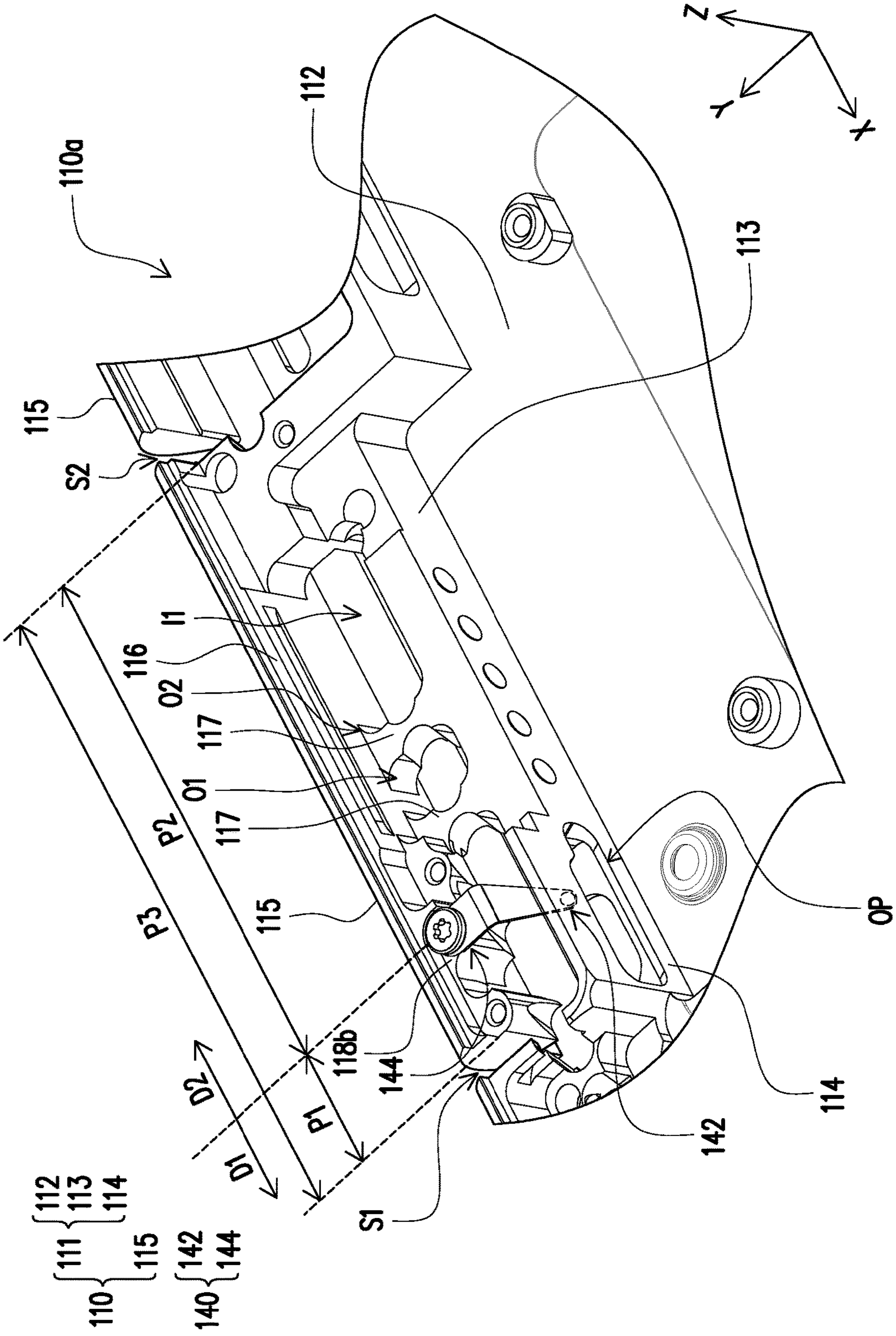
FIG. 3 is a schematic diagram of a metal housing in FIG. 1.

FIG. 3 is a schematic diagram of a metal housing in FIG. 1. FIG. 3 shows the metal housing 110 in the area E of FIG. 1 and some elements are omitted. Referring to FIG. 2 and FIG. 3, the frame 115 is located on a side of the back cover 111. A slot I1 is arranged between the back cover 111 and the frame 115, and the frame 115 includes two slits S1 and S2 and a segment P3. The slot I1 (FIG. 2) is arranged between a base plate 112 of the back cover 111 and the frame 115. The two slits S1 and S2 are connected with the slot I1 to form a U shape. The segment P3 is surrounded by the two slits S1 and S2 and the slot I1. As shown in FIG. 2, the slit S1 and S2 and slot I1 are actually filled by the housing connecting portion 180 to provide a more stable connection between the back cover 111 and the frame 115. Here, a width of each of the slits S1 and S2 is between 1.5 mm and 3 mm, for example, 2 mm.

The electronic device 100 further includes a first antenna module 110*a*. The first antenna module 110*a* includes an antenna radiator 116 formed by the segment P3. As shown in FIG. 3, the antenna radiator 116 is surrounded by the slot I1 and the two slits S1 and S2. In other words, in this embodiment, a part of the frame 115 (the segment P3) serves as the antenna radiator 116, thus eliminating the need for additional radiators in the metal housing 110 and saving space.

The first antenna module 110*a* further includes an elastic piece 140 disposed on the antenna radiator 116. Specifically, the antenna radiator 116 includes a protrusion 118*b*, and the protrusion 118*b* extends along a −Y-axis toward the base plate 112 of the back cover 111. An end 144 of the elastic piece 140 is disposed on the protrusion 118*b* through a fastener (e.g., a screw). The other end 142 of the elastic piece 140 is away from the antenna radiator 116 and extends toward the base plate 112. Here, the end 142 is a feeding end of the first antenna module 110*a* and is connected to a signal source (described later).

The antenna radiator 116 also includes a first section P1 and a second section P2. The first section P1 extends from the protrusion 118*b* along a first direction D1, and the second section P2 extends from the protrusion 118*b* along a second direction D2 opposite to the first direction D1. The first direction D1 and the second direction D2 are parallel to the X-axis. Here, a length of the second section P2 is greater than a length of the first section P1.

The back cover 111 includes a base plate 112, a boss 113 and an inner wall 114 protruding from the base plate 112 along a Z-axis. The inner wall 114 is connected to the boss 113. A length of the boss 113 on the X-axis roughly corresponds to a length of the second section P2 of the antenna radiator 116 on the X-axis, and a length of the inner wall 114 on the X-axis roughly corresponds to a length of the first section P1 on the X-axis, but not limited thereto.

The antenna radiator 116 and the back cover 111 are connected through multiple connecting portions 117, and the back cover 111 is suitable as a ground plane of the first antenna module 110*a*. Specifically, the second section P2 of the antenna radiator 116 is coupled to the boss 113 of the back cover 111 across the slot I1 through these connecting portions 117 (i.e., the connecting portions 117 are located between the second section P2 and the boss 113 of the back cover 111) for grounding. As can be seen, the radiator and the ground plane of the first antenna module 110*a* in this embodiment are actually formed by the frame 115 (the segment P3) of the metal housing 110 and a partial area of the back cover 111, in order to save space. In addition, since the antenna radiator 116 is a part of the metal housing 110, there is no metal shielding outside the antenna radiator 116, and the antenna radiator 116 is not subject to metal shielding interference.

Figure 4:
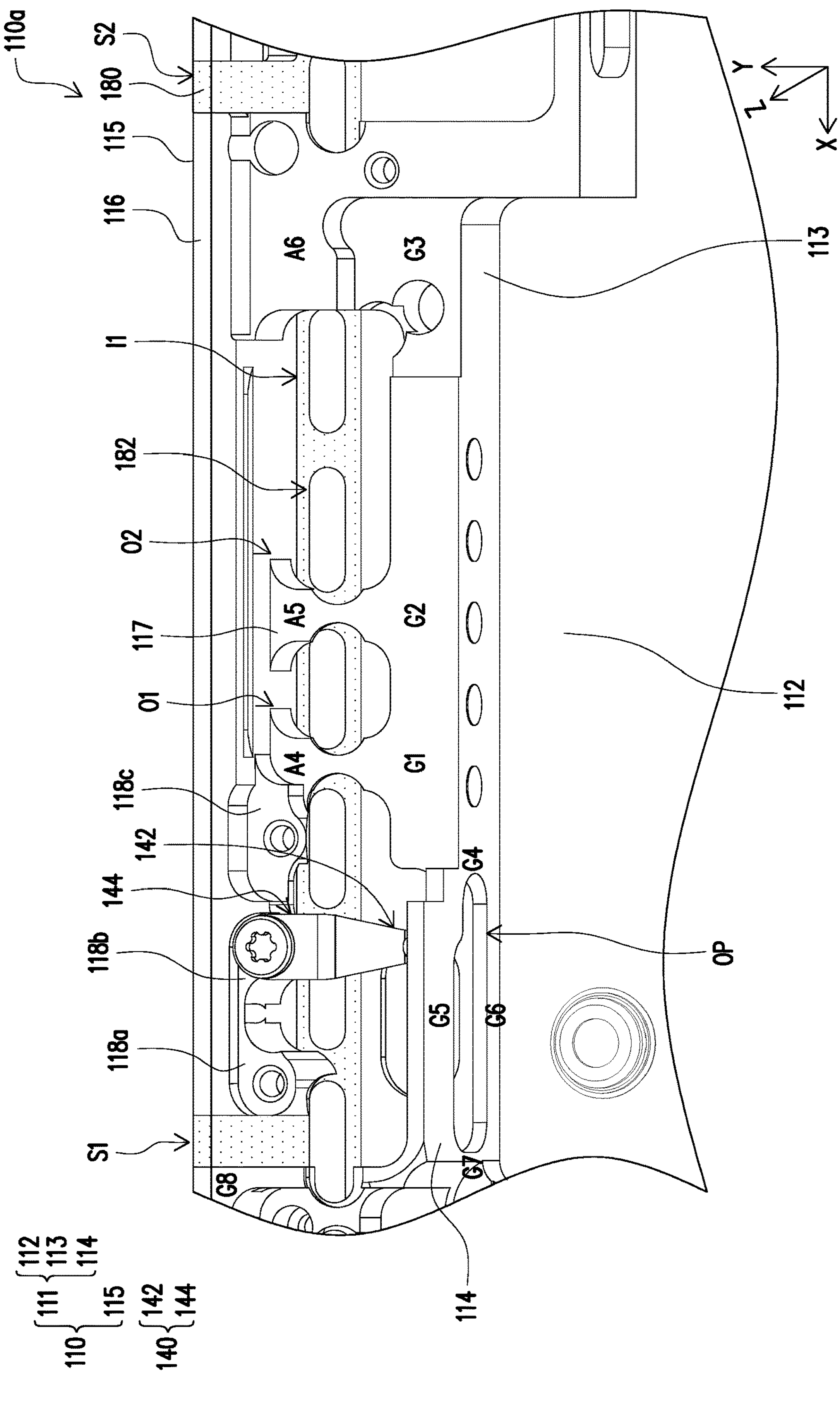
FIG. 4 is a schematic diagram of the metal housing and a housing connecting portion in FIG. 1 from another viewpoint.

FIG. 4 is a schematic diagram of the metal housing and a housing connecting portion in FIG. 1 from another viewpoint. FIG. 4 shows the metal housing 110 and the housing connecting portion 180 from another viewpoint. Referring to FIG. 4, the frame 115 further includes a frame ground portion G8, and the frame ground portion G8 is separated from the first section P1 by one of the two slits S1 and S2. Here, the frame ground portion G8 is separated from the first section P1 by the slit S1. A part of the inner wall 114 extends along a Y-axis and is connected to the frame ground portion G8.

The first antenna module 110*a* of this embodiment is a broadband antenna. The first antenna module 110*a* is configured to resonate at a first frequency band and a second frequency band. The first frequency band is between 2300 MHz and 2500 MHz, and more specifically, between 2400 MHz and 2500 MHz. The second frequency band is between 5150 MHz and 7125 MHz.

Specifically, the first antenna module 110*a* has multiple radiation paths. As shown in FIG. 4, a first radiation path is from the feeding end (i.e., the end 142 of the elastic piece 140) through points A4, A5, and A6 to the boss 113, and points G3, G2, G1, G4, G5, and G7 of the inner wall 114 to the frame ground portion G8. In this way, the first antenna module 110*a* may forms an IFA (inverted-F antenna) characteristic and resonates at low frequency 2300 MHz and first high frequency 5500 MHz.

A second radiation path is connected to the points G3, G2, and G1 through the points A4, A5, and A6 from the feeding end (i.e., the end 142 of the elastic piece 140), so that the first antenna module 110*a* forms a loop antenna characteristic and resonates at a second high frequency 6000 MHz. Two ground paths connecting point A4 to point G1 and point A5 to point G2 in the loop antenna may be used to control a position of resonance frequency point of a low frequency and an impedance matching bandwidth of the first and the second high frequency respectively.

It should be noted that FIG. 4 also includes the housing connecting portion 180 and multiple heat dissipation holes 182 of the housing connecting portion 180. Here, the housing connecting portion 180 is filled with dots to distinguish it from the metal housing 110. As shown in FIG. 4 and FIG. 2, the second section P2 of the antenna radiator 116, the connecting portions 117, and the boss 113 jointly form multiple through holes O1 and O2. The heat dissipation holes 182 are exposed to the through holes O1 and O2, so that the heat dissipation holes 182 are connected to the through holes O1 and O2, and form multiple connecting paths. The interior of the metal housing 110 may be connected to the external environment through the connecting paths, and heat inside the metal housing 110 may be dissipated to the external environment to improve cooling efficiency of the electronic device 100.

Figure 5:
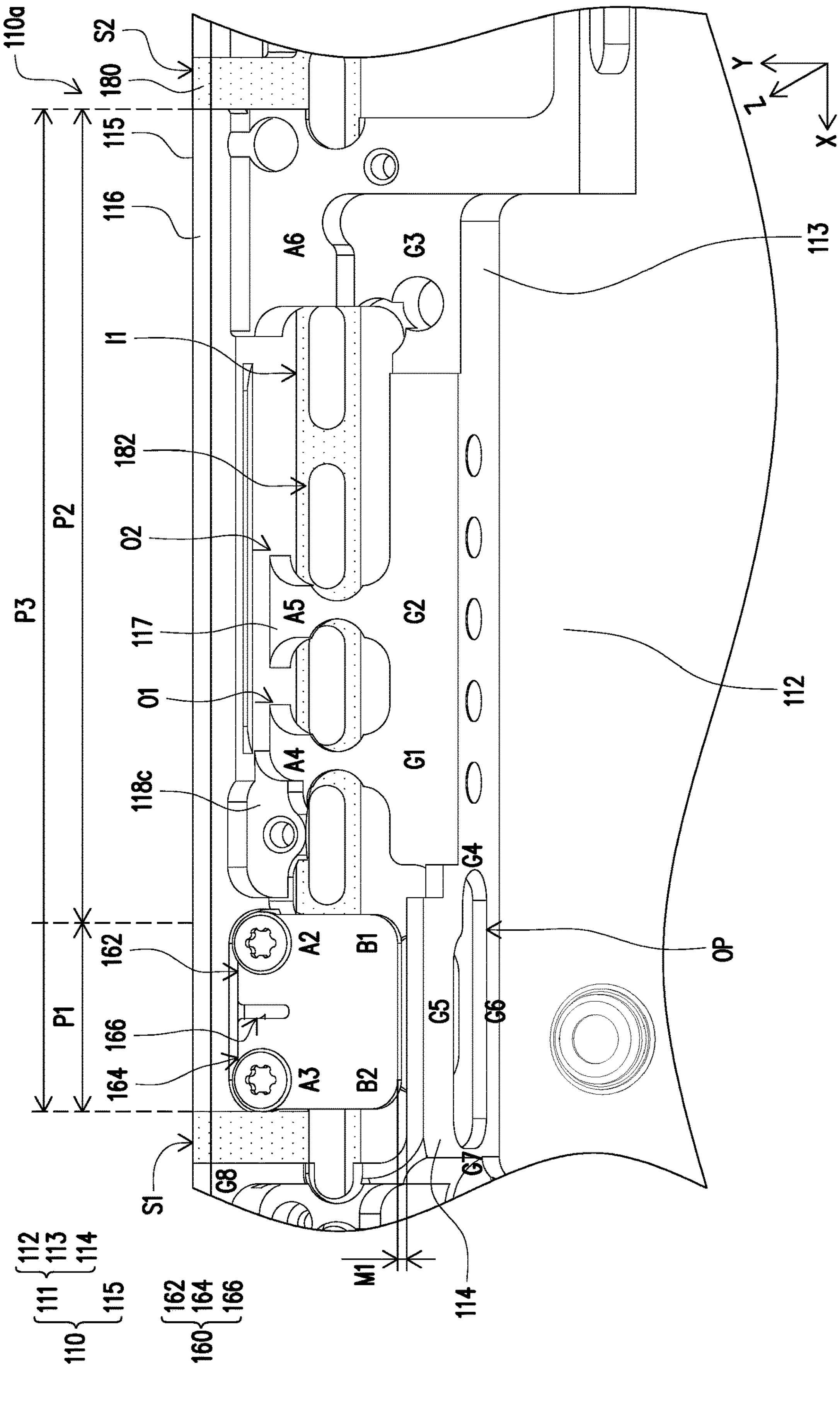
FIG. 5 is a schematic diagram of the metal housing, the housing connecting portion, and a U-shaped conductor in FIG. 1.

FIG. 5 is a schematic diagram of the metal housing, the housing connecting portion, and a U-shaped conductor in FIG. 1. Here, the housing connecting portion 180 is filled with dots to distinguish it from the metal housing 110. Referring to FIG. 4 and FIG. 5 at the same time, the antenna radiator 116 has multiple protrusions 118*a*, 118*b*, and 118*c*, and the end 144 of the elastic piece 140 is connected to the protrusion 118*b* (FIG. 4). The first antenna module 110*a* also includes a U-shaped conductor 160. The U-shaped conductor 160 is disposed on the antenna radiator 116. Two ends 162 and 164 of the U-shaped conductor 160 are respectively locked to the protrusions 118*a* and 118*b*, and an end 162 of the U-shaped conductor 160 is connected to the end 144 of the elastic piece 140 (FIG. 4) through the protrusion 118*b*, and then electrically connected to the feeding end (i.e., the end 142 of the elastic piece 140). A notch 166 is formed between the two ends 162 and 164 of the U-shaped conductor 160, and an opening of the notch 166 faces the frame 115.

Here, the U-shaped conductor 160 is vertically connected to the antenna radiator 116, and a conductor coupling gap M1 exists between the U-shaped conductor 160 and the inner wall 114. The conductor coupling gap M1 is between 0.5 mm and 1 mm, for example, 0.5 mm.

As shown in FIG. 5, the U-shaped conductor 160 has another path formed by points A2, B1, B2, and A3. A conductor coupling gap M1 exists between the path of points A2, B1, B2, and A3 and a path of the points G4, G5, G6, and G7 of the inner wall 114. The first antenna module 110*a* (broadband antenna) may increase the impedance matching bandwidth of the high frequency first and second resonance through the U-shaped conductor 160. In addition, a user may also adjust a size of the opening of the notch 166 of the U-shaped conductor 160 to adjust impedance matching of the first antenna module 110*a* (broadband antenna). In this embodiment, the antenna radiator 116, the elastic piece 140, and the U-shaped conductor 160 work together as a radiator of the first antenna module 110*a*, that is, the first antenna module 110*a* resonates at the first frequency band and the second frequency band through the antenna radiator 116, the elastic piece 140, and the U-shaped conductor 160 to generate a frequency band required by Wi-Fi 6E.

Figure 6:
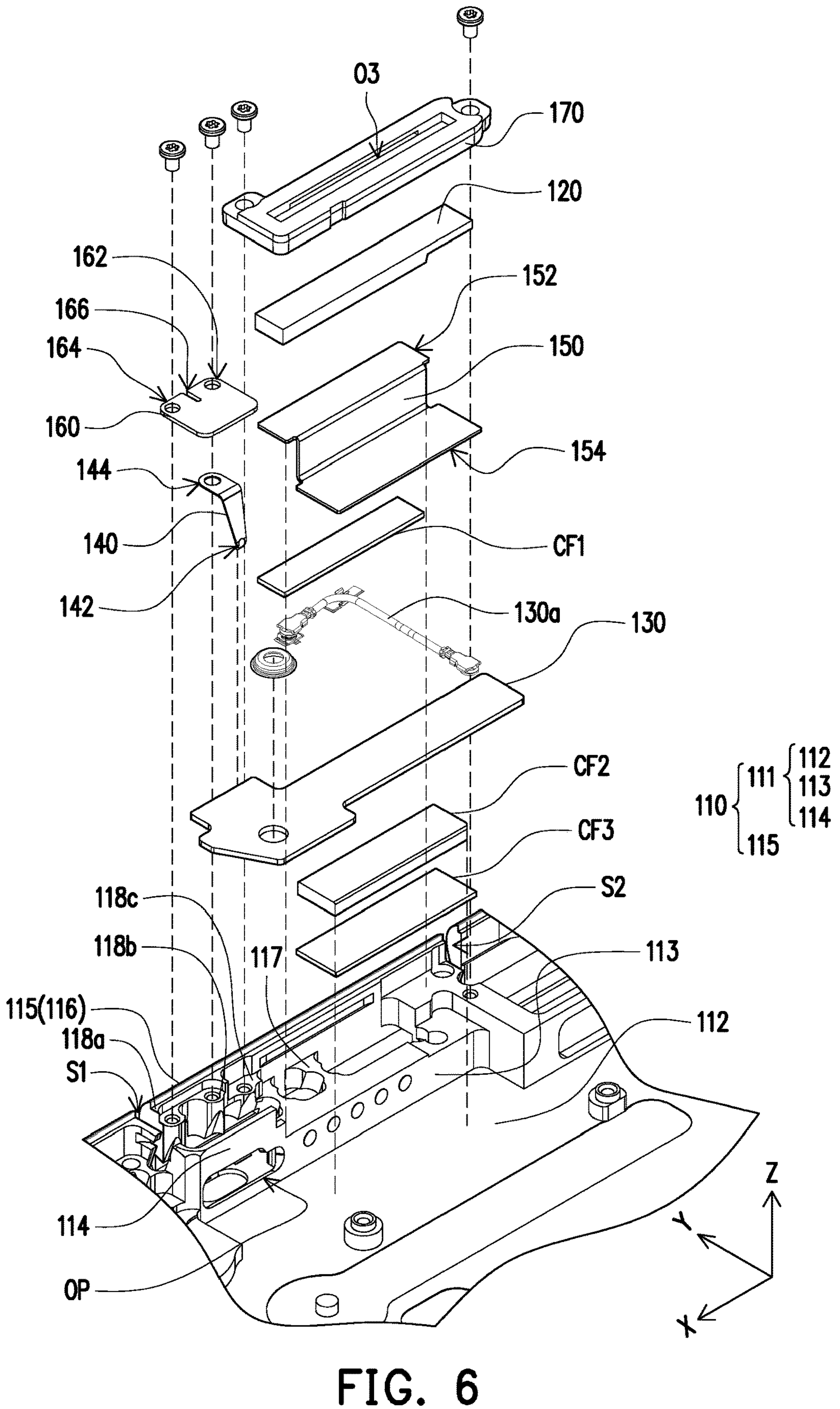
FIG. 6 is a schematic diagram of the electronic device in FIG. 1 before completion of assembly of some components.
Figure 7:
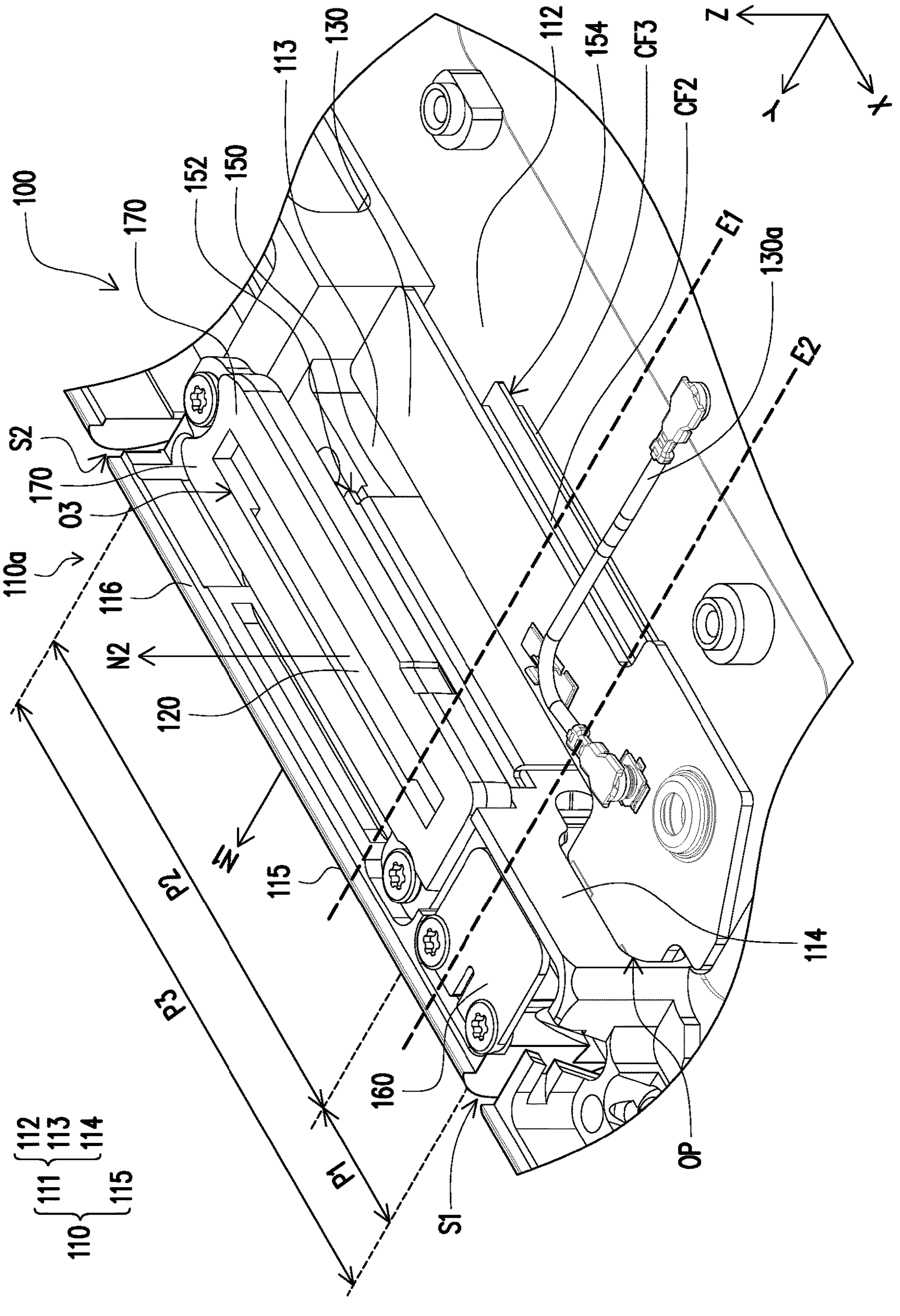
FIG. 7 is a schematic diagram of the electronic device in FIG. 1 after completion of assembly of some components.
Figure 8:
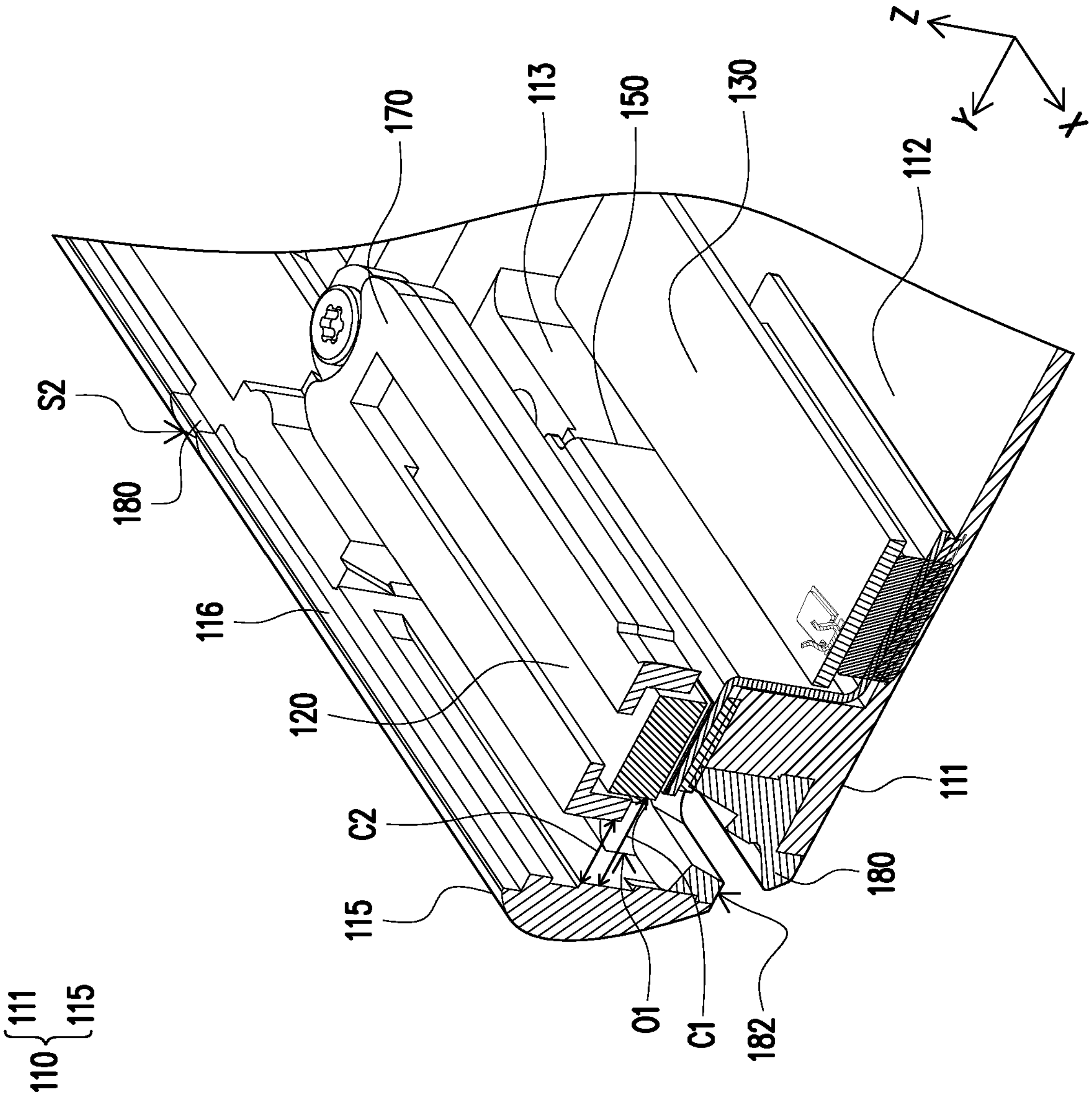
FIG. 8 is a cross-sectional diagram of some components of the electronic device in FIG. 7.
Figure 9:
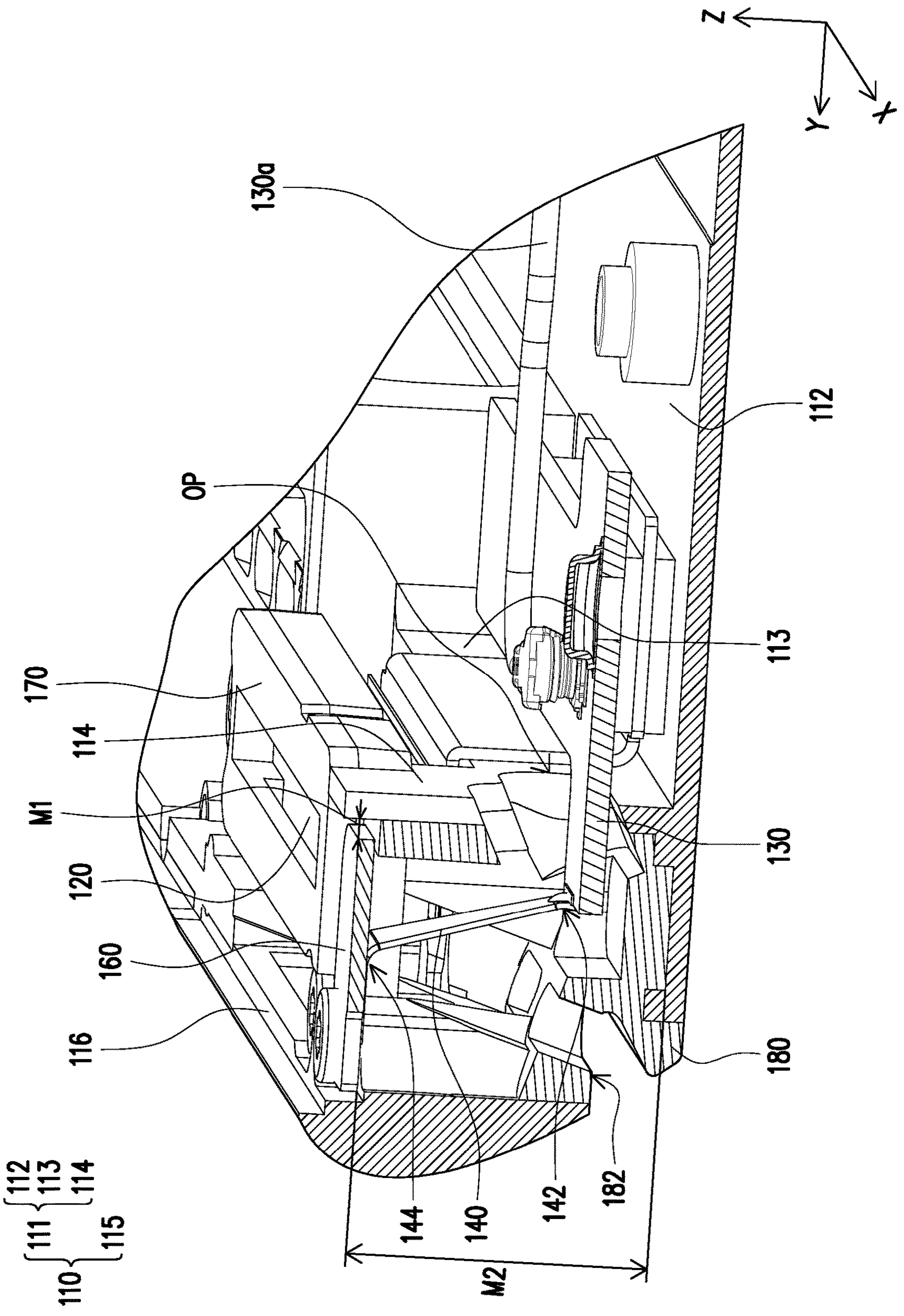
FIG. 9 is another cross-sectional diagram of some components of the electronic device in FIG. 7.

FIG. 6 is a schematic diagram of the electronic device in FIG. 1 before completion of assembly of some components. FIG. 7 is a schematic diagram of the electronic device in FIG. 1 after completion of assembly of some components. FIG. 8 is a cross-sectional diagram of some components of the electronic device in FIG. 7. FIG. 9 is another cross-sectional diagram of some components of the electronic device in FIG. 7. FIG. 8 is a cross-sectional diagram along a line E1 of FIG. 7, and FIG. 9 is a cross-sectional diagram along a line E2 of FIG. 7. FIG. 8 and FIG. 9 additionally illustrate the housing connecting portion 180 of the electronic device 100 (FIG. 2).

Referring to FIG. 6 to FIG. 9 at the same time, the electronic device 100 of this embodiment also includes a second antenna module 120, a coaxial transmission line 130*a*, a metal wall 150, an insulating holder 170, a first conductive element CF1, a second conductive element CF2, and a third conductive element CF3. The first antenna module 110*a* further includes an antenna circuit board 130 located in the area E.

As shown in FIG. 6, the boss 113 and the connecting portions 117 jointly form a carrying surface suitable for carrying the second antenna module 120 to improve the space utilization of the electronic device 100. Here, the second antenna module 120 is a millimeter wave antenna. The second antenna module 120 is configured to resonate at a third frequency band and a fourth frequency band. The third frequency band is one of 28 GHz or 39 GHz, and the fourth frequency band is the other one of 28 GHz or 39 GHz.

Specifically, as shown in FIG. 6 and FIG. 7, the second antenna module 120 is fixed on the insulating holder 170. A surface of the insulating holder 170 has a hole O3, and the second antenna module 120 is partially exposed through the hole O3 (FIG. 7). The insulating holder 170 abuts on the connecting portions 117 and the boss 113 (i.e., the insulating holder 170 abuts on the carrying surface), so that the second antenna module 120 is disposed on the connecting portions 117 and the boss 113. An end of the insulating holder 170 is locked to the protrusion 118*c* of the antenna radiator 116 (FIG. 6), and another end is locked to the boss 113, so that the second antenna module 120 is located next to the frame 115 and corresponds to the second section P2 of the antenna radiator 116 (FIG. 7).

As shown in FIG. 8, an antenna coupling gap C1 exists between the second antenna module 120 and the frame 115 (the antenna radiator 116). The antenna coupling gap C1 is between 2 mm and 4 mm, for example, 3 mm. An antenna spacing C2 exists between the insulating holder 170 and the frame 115 (the antenna radiator 116). The antenna spacing C2 is between 2 mm and 3 mm, for example, 2.3 mm. The antenna coupling gap C1 and the antenna spacing C2 are suitable for reducing near-field coupling between the antenna radiator 116 and the second antenna module 120, so as not to affect an antenna performance and the impedance matching bandwidth of the first antenna module 110*a* (broadband antenna).

As shown in FIG. 7, the antenna circuit board 130 is disposed on the base plate 112 and partially located on a side of the boss 113 and the inner wall 114. The metal wall 150 is located between the second antenna module 120 and the antenna circuit board 130. An end portion 152 of the metal wall 150 is located between the second antenna module 120 and the boss 113, and another end portion 154 is located between the antenna circuit board 130 and the base plate 112. The second antenna module 120 and the antenna circuit board 130 are lapped (coupled) to the base plate 112 of the back cover 111 through the metal wall 150 to be grounded.

Specifically, a side of the end portion 152 may connect the second antenna module 120 to a main board (not shown) of the electronic device 100 through an FPC cable (not shown), so as to transmit a signal from the main board to the second antenna module 120, or transmit a signal of the second antenna module 120 to the main board. Another side of the end portion 152 is connected to the boss 113 through the first conductive element CF1. A second conductive element CF2 is disposed between a side of the end portion 154 and the antenna circuit board 130, and a third conductive element CF3 is disposed between another side of the end portion 154 and the base plate 112. The antenna circuit board 130 is coupled to the base plate 112 through the second conductive element CF2, the third conductive element CF3 and the end portion 154. Of course, an electrical connection between the metal wall 150 and the second antenna module 120 and the base plate 112 is not limited thereto. The first conductive element CF1 in this embodiment is, for example, a conductive foam, the second conductive element CF2 is, for example, a conductive cloth covered the conductive foam, and the third conductive element CF3 is, for example, a conductive adhesive, but not limited thereto.

As shown in FIG. 9, the end 144 of the elastic piece 140 is locked on the protrusion 118*b* (FIG. 6) and connected with the U-shaped conductor 160 and the antenna radiator 116. The end 142 of the elastic piece 140 (i.e., the feeding end of the antenna radiator 116) extends toward the base plate 112. Here, the U-shaped conductor 160 and the elastic piece 140 are located between the antenna radiator 116 and the inner wall 114. The elastic piece 140 is in an inverted L shape, but not limited thereto.

The inner wall 114 includes a hole OP, and the antenna circuit board 130 is partially connected to the end 142 of the elastic piece 140 through the hole OP. In this way, the antenna circuit board 130 may be connected (lapped) to the antenna radiator 116 through the elastic piece 140. The coaxial transmission line 130*a* is disposed on the antenna circuit board 130 and is suitable for connecting the antenna circuit board 130 to the main board. The coaxial transmission line 130*a* transmits the signal from the main board (signal source) to the feeding end of the first antenna module 110*a* (i.e., the end 142 of the elastic piece 140) through the antenna circuit board 130. In addition, a signal of the first antenna module 110*a* (broadband antenna) may also be transmitted from the antenna radiator 116 to the antenna circuit board 130 through the elastic piece 140, and the signal is transmitted from the antenna circuit board 130 to the main board through the coaxial transmission line 130*a*.

As shown in FIG. 9, a pad is on a side wall of the antenna circuit board 130 facing the end 142, and the pad is connected to the end 142 of the elastic piece 140. A signal fed by the antenna may be transmitted through the pad to end 142. In addition, a conducting space M2 is between the U-shaped conductor 160 and the base plate 112 of the back cover 111, and the conducting space M2 is between 5 mm and 10 mm, for example, 7.5 mm.

So far, the two antennas of the electronic device 100 (the first antenna module 110*a* as a broadband antenna and the second antenna module 120 as a millimeter wave antenna) are set up. The second antenna module 120 is disposed adjacent to the antenna radiator 116 (the frame 115), and the second antenna module 120 is stacked on the connecting portion 117 and shares part of the space with the first antenna module 110*a*, so that the electronic device 100 may complete the installation of the two antennas in a limited space to improve the space utilization of the electronic device 100.

The concept of this disclosure may be applied to all kinds of electronic devices (e.g., tablet computers, laptops, cell phones, etc.) with metal housing structure by integrating Wi-Fi 6E antennas (broadband antennas) and millimeter wave modules so that Wi-Fi 6E antennas and millimeter wave modules may share the same limited structural space to achieve multi-input multi-output (MIMO) multi-antenna space configuration.

For example, the two antennas in this embodiment are installed in a limited space with a length of 37 mm (on the X-axis), a width of 8.5 mm (on the Y-axis), and a height of 7.5 mm (on the Z-axis). Moreover, in addition to the first antenna module 110*a* and the second antenna module 120 of this embodiment, the electronic device 100 may be provided with additional antenna devices (not shown).

In a conventional electronic device, there are problems such as large mutual coupling interference and poor radiation efficiency when multiple antennas are integrated in the electronic device. In the electronic device 100 of this embodiment, the radiation direction of the first antenna module 110*a* (broadband antenna) is perpendicular to the radiation direction of the second antenna module 120 (millimeter wave antenna) to avoid mutual interference between the two antennas and to achieve a goal of multiple antenna integration.

Specifically, as shown in FIG. 7, the first antenna module 110*a* radiates along a first normal direction N1. The second antenna module 120 radiates along a second normal direction N2. The first normal direction N1 is perpendicular to the second normal direction N2, so that the radiation directions of the first antenna module 110*a* and the second antenna module 120 are staggered from each other. Here, the first normal direction N1 is parallel to the Y-axis, and the second normal direction N2 is parallel to the Z-axis.

Referring back to FIG. 1, a screen display area 192 of the screen 190 (shown as dashed lines) should be disposed to take into account locations of the antennas (e.g., the first module 110*a* and the second antenna module 120) to avoid blocking the antennas and obstructing the reception or transmission of antenna signals. Since the second antenna module 120 of this embodiment is disposed adjacent to the antenna radiator 116 (the frame 115) (FIG. 7), so that a side of the screen display area 192 may be closer to the frame 115, and the electronic device 100 has a larger screen display area 192. In other words, the screen 190 of the electronic device 100 may have a smaller frame width W.

Figure 10:
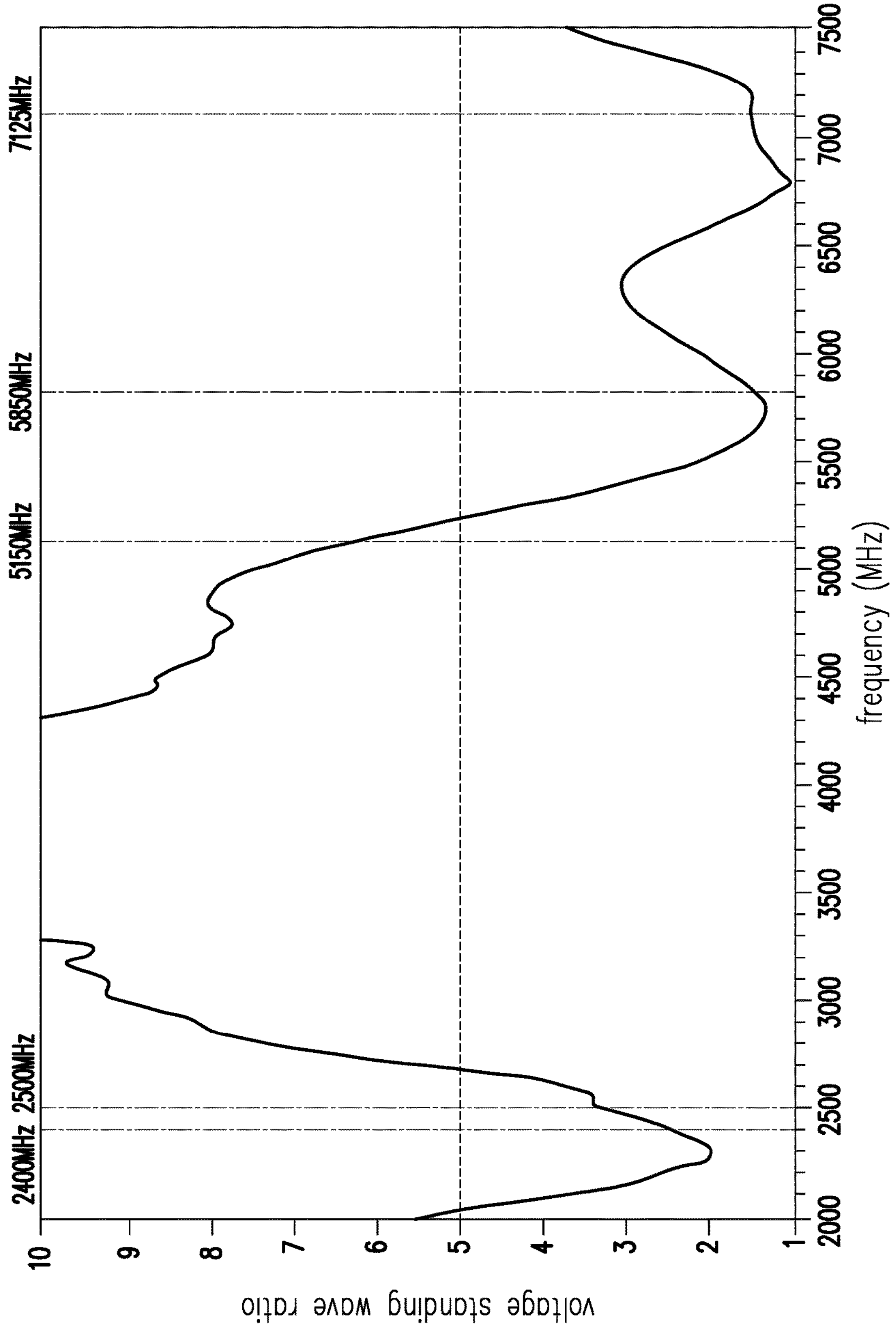
FIG. 10 shows a relationship between frequency and a voltage standing wave ratio of a first antenna module in FIG. 7.

FIG. 10 shows a relationship between frequency and a voltage standing wave ratio of a first antenna module in FIG. 7. Referring to FIG. 10, the antenna circuit board 130 (FIG. 7) includes a matching circuit. The matching circuit is, for example, an inductance-capacitance circuit in which the first antenna module 110*a* (broadband antenna) is connected in series with an inductor and then in parallel with a capacitor, but not limited thereto. A test was performed with inductance of 1 nH, capacitance of 0.1 pF, and an antenna coupling gap C1 (FIG. 8) of 3 mm to confirm a relationship between frequency and a voltage standing wave ratio (VSWR) of the first antenna module 110*a* (broadband antenna). As shown in FIG. 10, there are no surges within a frequency range of 5150 MHz to 7125 MHz with a voltage standing ratio greater than 5, resulting in good performance of the first antenna module 110*a* (broadband antenna).

Figure 11:
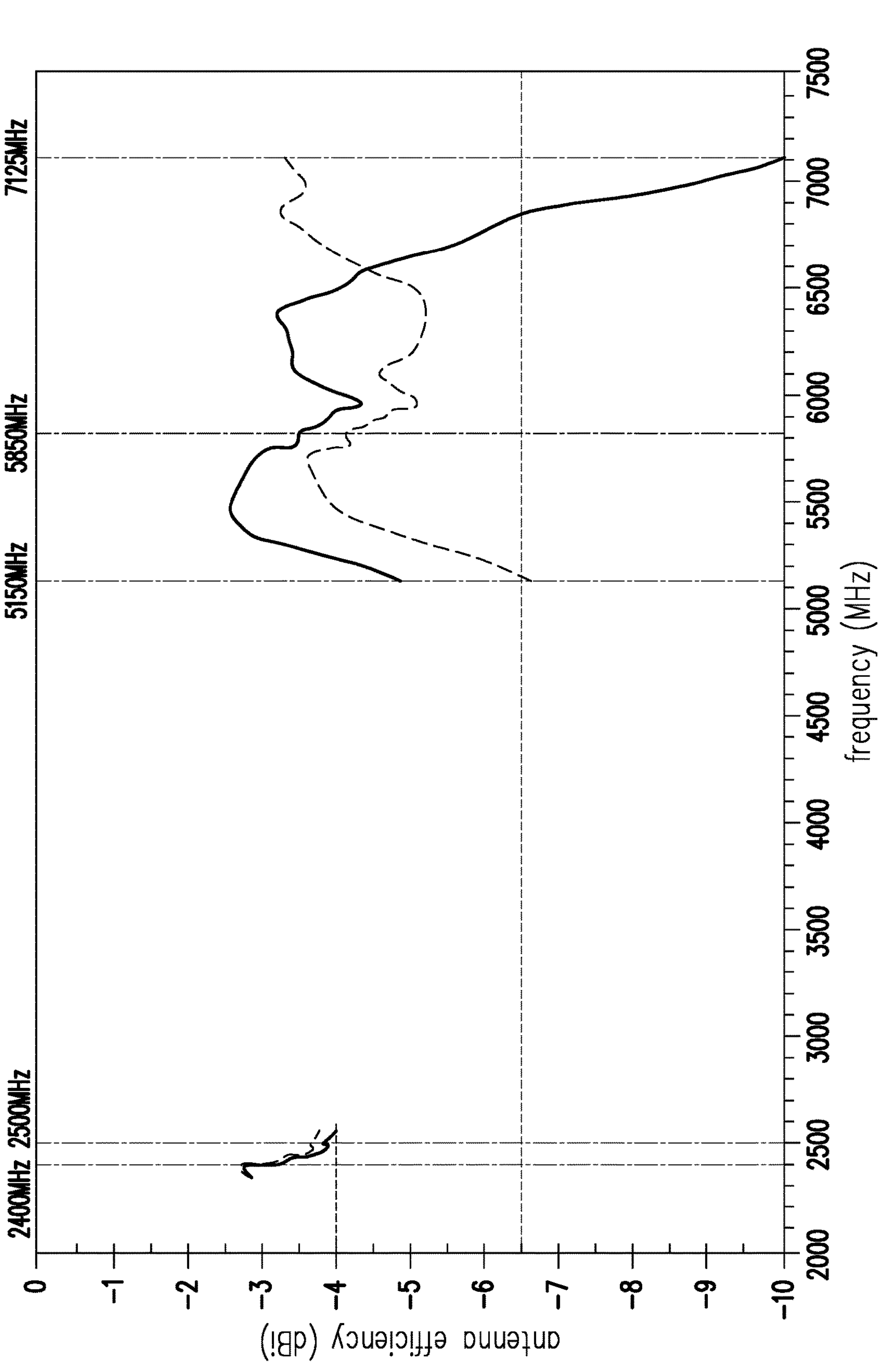
FIG. 11 shows a relationship between frequency and antenna efficiency of the first antenna module in FIG. 7.

FIG. 11 shows a relationship between frequency and antenna efficiency of the first antenna module in FIG. 7. FIG. 11 shows a relationship between frequency and antenna efficiency of the first antenna module (FIG. 7) with frequencies between 2400 MHz and 2500 MHz and between 5150 MHz and 7125 MHz. Referring to FIG. 11, the dashed line shows a relationship between frequency and antenna efficiency of the first antenna module 110*a* (broadband antenna) under a condition that the matching circuit is first connected in series with the inductance of 1 nH and then connected in parallel with the capacitance of 0.1 pF. The solid line shows a relationship between frequency and antenna efficiency of the first antenna module 110*a* (broadband antenna) under a condition that the matching circuit is first connected in parallel with a capacitance of 0.2 pF and then connected in series with an inductance of 1.2 nH.

As shown in FIG. 11, in both cases, power of the first antenna module 110*a* (broadband antenna) is greater than −4 dBi in a frequency range from 2400 MHz to 2500 MHz, and the power is greater than −6.5 dBi within a frequency range from 5150 MHz to 7125 MHz. As can be seen, in both cases, the first antenna module 110*a* (broadband antenna) may have good antenna performance.

To sum up, the electronic device of this disclosure includes a metal housing, a first antenna module, and a second antenna module. The metal housing includes a frame and a back cover, and the first antenna module includes an antenna radiator formed by a segment of frame. The antenna radiator is connected to the back cover through connecting portions for grounding. In short, the radiator and a ground plane of the first antenna module are actually formed by the frame of the metal housing and a partial area of the back cover, in order to save space. In addition, since the antenna radiator is a part of the metal housing (frame), there is no metal shielding outside the antenna radiator, and the antenna radiator is not subject to metal shielding interference. The first antenna module includes an elastic piece. The elastic piece is disposed on the antenna radiator and an end of the elastic piece is suitable as a feeding end of the first antenna module. The second antenna module is stacked on the connecting portion and adjacent to the antenna radiator, so that the electronic device may integrate two antennas in a limited space to improve the space utilization of the electronic device, and the electronic device retains the aesthetic appearance of the metal housing. Moreover, since the second antenna module is adjacent to the antenna radiator, a distance between a screen display area and the frame may be shortened (i.e., a frame width of the screen is shortened), so that the electronic device has a larger screen display area.

In addition, the radiation direction of the first antenna module is perpendicular to the radiation direction of the second antenna module to avoid mutual interference between the two antennas. The first antenna module is suitable as a broadband antenna and is configured to couple the first frequency band and the second frequency band, i.e., between 2400 MHz and 2500 MHz and between 5150 MHz and 7125 MHz. The second antenna module is suitable as a millimeter wave antenna and is configured to couple the third frequency band and the fourth frequency band, i.e., 28 GHz and 39 GHz. The first antenna module has multiple radiation paths to form the IFA antenna characteristic and to form the loop antenna characteristic. The first antenna module also includes a U-shaped conductor disposed on the antenna radiator. A conductor coupling gap is between the U-shaped conductor and an inner wall of the back cover, and a conducting space is between the U-shaped conductor and a base plate of the back cover to increase an impedance matching bandwidth of the first antenna module. Moreover, the electronic device also includes an antenna circuit board with a matching circuit, so that the first antenna module has good antenna performance.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. An electronic device comprising:

a metal housing comprising:

a back cover; and a frame located on a side of the back cover, a slot being arranged between the back cover and the frame, the frame comprising two slits and a segment, the two slits connected with the slot to form a U shape, and the segment surrounded by the two slits and the slot;

a first antenna module configured to resonate at a first frequency band and a second frequency band, and comprising an antenna radiator formed by the segment, and the antenna radiator coupled to the back cover across the slot through a plurality of connecting portions; and a second antenna module disposed on the connecting portions to be coupled to the back cover and grounded, an antenna coupling gap existing between the second antenna module and the frame, the second antenna module configured to resonate at a third frequency band, and a radiation direction of the first antenna module being perpendicular to a radiation direction of the second antenna module.

2. The electronic device according to claim 1, wherein the first antenna module further comprises an elastic piece, the antenna radiator comprises a protrusion, a first section and a second section, the elastic piece is disposed on the protrusion, an end of the elastic piece is away from the antenna radiator and is a feeding end of the first antenna module, the first section of the antenna radiator extends from the protrusion along a first direction, the second section of the antenna radiator extends from the protrusion along a second direction opposite to the first direction, and the second section is coupled to the back cover through the connecting portions.

3. The electronic device according to claim 2, wherein the first antenna module further comprises an antenna circuit board, the end of the elastic piece is connected to the antenna circuit board, and the antenna circuit board comprises a matching circuit.

4. The electronic device according to claim 3 further comprising a metal wall located between the second antenna module and the antenna circuit board, and the second antenna module being lapped to the back cover through the metal wall.

5. The electronic device according to claim 3, wherein the back cover comprises a base plate, and a boss and an inner wall protruding from the base plate, the boss is connected to the inner wall, the connecting portions are connected to the base plate through the boss, the inner wall comprises a hole, and the antenna circuit board is lapped through the hole to the antenna radiator.

6. The electronic device according to claim 2, wherein the first antenna module further comprises a U-shaped conductor vertically connected to the antenna radiator, and an end of the U-shaped conductor is electrically connected to the feeding end of the antenna radiator.

7. The electronic device according to claim 6, wherein a conducting space is arranged between the U-shaped conductor and the back cover, and the conducting space is between 5 mm and 10 mm.

8. The electronic device according to claim 6, wherein the back cover comprises a base plate and an inner wall protruding from the base plate and corresponding to the first section, a conductor coupling gap exists between the U-shaped conductor and the inner wall, and the conductor coupling gap is between 0.5 mm and 1 mm.

9. The electronic device according to claim 1 further comprises an insulating holder, the second antenna module is fixed on the insulating holder, an antenna spacing exists between the insulating holder and the frame, and the antenna spacing is between 2 mm and 3 mm.

10. The electronic device according to claim 1, wherein the antenna coupling gap is between 2 mm and 4 mm.

11. The electronic device according to claim 1, wherein the first frequency band is between 2400 MHz and 2500 MHz, the second frequency band is between 5150 MHz and 7125 MHz, and the third frequency band is 28 GHz or 39 GHz.

* * * * *